US008473909B2

(12) United States Patent
Ramachandran

(10) Patent No.: US 8,473,909 B2
(45) Date of Patent: Jun. 25, 2013

(54) METHOD FOR PROVIDING ASSISTANCE IN MAKING CHANGE DECISIONS IN A CONFIGURABLE MANAGED ENVIRONMENT

(75) Inventor: Puthukode G. Ramachandran, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/159,114

(22) Filed: Jun. 13, 2011

(65) Prior Publication Data

US 2011/0239191 A1 Sep. 29, 2011

Related U.S. Application Data

(63) Continuation of application No. 11/627,398, filed on Jan. 26, 2007, now abandoned.

(51) Int. Cl.
*G06F 9/44* (2006.01)
*G06F 7/08* (2006.01)
*G06Q 30/02* (2012.01)

(52) U.S. Cl.
USPC ............... 717/121; 717/120; 717/168; 707/7; 707/104.1; 707/769

(58) Field of Classification Search
None
See application file for complete search history.

(56) References Cited

U.S. PATENT DOCUMENTS

| | | | |
|---|---|---|---|
| 5,914,879 A | * | 6/1999 | Wang et al. ............... 700/111 |
| 6,128,730 A | | 10/2000 | Levine |
| 6,385,770 B1 | | 5/2002 | Sinander |
| 6,704,737 B1 | | 3/2004 | Nixon et al. |
| 6,804,632 B2 | | 10/2004 | Orenstein |
| 6,832,346 B2 | | 12/2004 | Cross |
| 6,968,540 B2 | | 11/2005 | Beck et al. |

(Continued)

OTHER PUBLICATIONS

H. Madduri et al.,"A configuration management database architecture in support of IBM Service Management",[Online], 2007, pp. 441-457, [Retrieved from Internet on Jan. 29, 2013, <http://citeseerx.ist.psu.edu/viewdoc/download?doi=10.1.1.113.3729&rep=rep1&type=pdf>.*

(Continued)

*Primary Examiner* — Thuy Dao
*Assistant Examiner* — Ziaul A Chowdhury
(74) *Attorney, Agent, or Firm* — Yee & Associates, P.C.; Jeffrey S. LaBaw

(57) ABSTRACT

A method is provided for assigning weights to configuration items (CIs) in a configurable managed system, wherein respective weights are derived from information contained in an associated configuration management database. The information could include without limitation the relationships that a configuration item (CI) has with other CIs and the number of reads and writes that are made between the CI and other CIs. A Change Manager in the configurable system makes changes affecting CIs, wherein different types of changes require different levels of confidence in the integrity of data in the CMDB. Accordingly, the weights of respective CIs are used to provide a confidence level regarding the accuracy of CMDB data, pertinent to a proposed change. The confidence level is then used by the Change Manager in deciding whether or not to make the change. One embodiment comprises acquiring information from the CMDB pertaining to CIs that would be affected by a particular change, and processing the acquired information to compute a confidence level indicating the probability that the acquired information is correct. The particular change is then allowed only if the confidence level is no less than a pre-specified minimum value.

20 Claims, 2 Drawing Sheets

U.S. PATENT DOCUMENTS

| | | | |
|---|---|---|---|
| 6,988,056 B2 | | 1/2006 | Cook |
| 7,051,243 B2 | | 5/2006 | Helgren et al. |
| 7,072,936 B2 | | 7/2006 | Sturtevant et al. |
| 7,080,168 B2 | | 7/2006 | Dasgupta et al. |
| 7,177,870 B2 | | 2/2007 | Jokela et al. |
| 7,254,522 B2 | | 8/2007 | Tsalakopoulos |
| 7,334,226 B2 | | 2/2008 | Ramachandran et al. |
| 7,343,623 B2 | | 3/2008 | Ross |
| 7,500,234 B2 | | 3/2009 | Hatasaki |
| 7,747,987 B1 | | 6/2010 | Akarte et al. |
| 7,756,828 B2 | | 7/2010 | Baron et al. |
| 7,765,094 B2 | | 7/2010 | Bodden et al. |
| 7,783,973 B2 | | 8/2010 | Banavar et al. |
| 7,913,227 B2 | * | 3/2011 | Aikens et al. ............... 717/120 |
| 7,926,031 B2 | * | 4/2011 | Faihe et al. .................. 717/121 |
| 2002/0133541 A1 | | 9/2002 | Sturtevant et al. ............ 709/203 |
| 2002/0184247 A1 | | 12/2002 | Jokela et al. |
| 2002/0199194 A1 | | 12/2002 | Ali |
| 2003/0018451 A1 | | 1/2003 | Sullivan et al. |
| 2003/0061132 A1 | | 3/2003 | Yu, Sr. et al. |
| 2003/0110012 A1 | | 6/2003 | Orenstein |
| 2003/0130887 A1 | | 7/2003 | Nathaniel |
| 2003/0204791 A1 | * | 10/2003 | Helgren et al. ................ 714/48 |
| 2004/0002880 A1 | | 1/2004 | Jones |
| 2004/0039917 A1 | | 2/2004 | Ross |
| 2004/0143600 A1 | | 7/2004 | Musgrove et al. |
| 2004/0162887 A1 | | 8/2004 | Dillon et al. |
| 2004/0220782 A1 | | 11/2004 | Cook |
| 2005/0015388 A1 | | 1/2005 | Dasgupta et al. |
| 2005/0065839 A1 | | 3/2005 | Benson et al. |
| 2005/0071838 A1 | * | 3/2005 | Hatasaki ........................ 717/168 |
| 2005/0097150 A1 | | 5/2005 | McKeon et al. |
| 2005/0097547 A1 | * | 5/2005 | Ramachandran et al. .... 717/177 |
| 2005/0144022 A1 | | 6/2005 | Evans |
| 2005/0210048 A1 | | 9/2005 | Beres et al. |
| 2006/0004875 A1 | * | 1/2006 | Baron et al. ................... 707/200 |
| 2006/0031371 A1 | | 2/2006 | Uthe |
| 2006/0101421 A1 | | 5/2006 | Bodden et al. |
| 2006/0149501 A1 | * | 7/2006 | Tsalakopoulos .............. 702/179 |
| 2006/0161879 A1 | | 7/2006 | Lubrecht et al. |
| 2007/0203952 A1 | | 8/2007 | Baron et al. |
| 2007/0234331 A1 | * | 10/2007 | Schow et al. ................. 717/168 |
| 2007/0239700 A1 | * | 10/2007 | Ramachandran ................ 707/5 |
| 2008/0140778 A1 | | 6/2008 | Banavar et al. |
| 2008/0183690 A1 | * | 7/2008 | Ramachandran ................ 707/5 |
| 2009/0012997 A1 | * | 1/2009 | Rajaraman et al. ......... 707/104.1 |
| 2009/0019046 A1 | * | 1/2009 | Coley et al. ....................... 707/7 |
| 2009/0248596 A1 | * | 10/2009 | Matsumoto et al. ............ 706/12 |
| 2010/0095273 A1 | * | 4/2010 | Matthiesen ................... 717/120 |
| 2010/0185658 A1 | * | 7/2010 | Kowalski ...................... 707/769 |

OTHER PUBLICATIONS

Vincenzo Amcroila et al., "The evolution of configuration management and version control" ,[Online], Software Engineering Journal, Nov. 1990, pp. 303-310, [Retrived from Internet on Jan. 29, 2013, <http://ieeexplore.ieee.org/stamp/stamp.jsp?tp=&arnumber=61744>.*

C. Word et al., "Integrated change and configuration management", [Online], IBM System Journal, 2007, pp. 459-478, [Retrieved froma Internet on Jan. 29, 2013], <http://ieeexplore.ieee.org/stamp/stamp.jsp?tp=&arnumber=5386575>.*

Hagen Volzer et al., "A Tool for Subsystem Configuration Management", [Online] , The University of Queessland Australia, Mar. 18, 2002, pp. 1-11, [Retrieved from Internet on Jan. 29, 2013], <http://itee.uq.edu.au/~pal/SVRC/tr02-07.pdf>.*

Madduri et al., "A Configuration Management Database Architecture in Support of IBM Service Management", 2007, pp. 1-17. <http://ieeexplore.ieee.org/stamp/stamp.jsp?tp=&arnumber=5386571>.

Amcroila et al., "The Evolution of Configuration Management and Version Control", Software Engineering Journal, Nov. 1990, pp. 303-310. <http://ieeexplore.ieee.org/stamp/stamp.jsp?tp=&arnumber=61744>.

Word et al., "Integrated Change and Configuration Management", IBM System Journal, 2007, pp. 1-20. <http://ieeexplore.ieee.org/stamp/stamp.jsp?tp=&arnumber=5386575>.

Kunz et al., "Fast Detection of Communication Patterns in Distributed Executions", Proceding Cascon 1997, pp. 1-263. <http://delivery.acm.org/10.1145/790000/782022/p12kunz.pdf?key1=782022&key2=0647473031&coll=DL&dl=ACM&ip=151.207.242.4&CFID=19577917&CFTOKEN=62294010>.

Elnaffar, "A Methodology for Auto-recognizing DBMS Workloads", IBM Canada, 2002, pp. 1-15. <http://delivery.acm.org/10.1145/790000/782117/p2elnaffar.pdf?key1=782117&key2=3957473031&coll=DL&dl=ACM&ip=151.207.242.4&CFID=19577917&CFTOKEN=62294010>.

Volzer et al., "A Tool for Subsystem Configuration Management", The University of Queessland Australia, Mar. 18, 2002, pp. 1-11. <http://itee.uq.edu.au/~pal/SVRC/tr02-07.pdf>.

Bezenchek et al., "A Data Structure for Representing Aggregate Data", IEEE, 1996, pp. 22-31.

"Service Management Functions, Configuration Management", Microsoft TechNet, Updated: Mar. 26, 2004, pp. 1-26. http://www.microsoft/com/technet/itsolutions/cits/mo/smf/smfcfgmg.mspx.

Mueller, "Taking the Configuration Management Database to the Next Level: The Federated Data Model", Computerworld, Apr. 18, 2005, pp. 1-4. http://www.computerworld.com/printthis/2005/0,4818,101081,00.html.

Lee et al., "Integrated Configuration Management System (ICMS) for Computer System Development" Innovation in Technology Management—The Key to Global Leadership. PICMET '97; Portland International Conference on Management and Technology, Jul. 27-31, 1997, pp. 472-475.

Coster, "Configuration Management: How it Applies to Expert Systems", Project Management, Costing and Quality Assurance, IEE Colloquium on Oct. 28, 1988, pp. 4/1-4/4.

USPTO Office Action for U.S. Appl. No. 11/627,398 dated Dec. 8, 2010.

USPTO Notice of Allowance for U.S. Appl. No. 11/627,398 dated May 2, 2011.

* cited by examiner

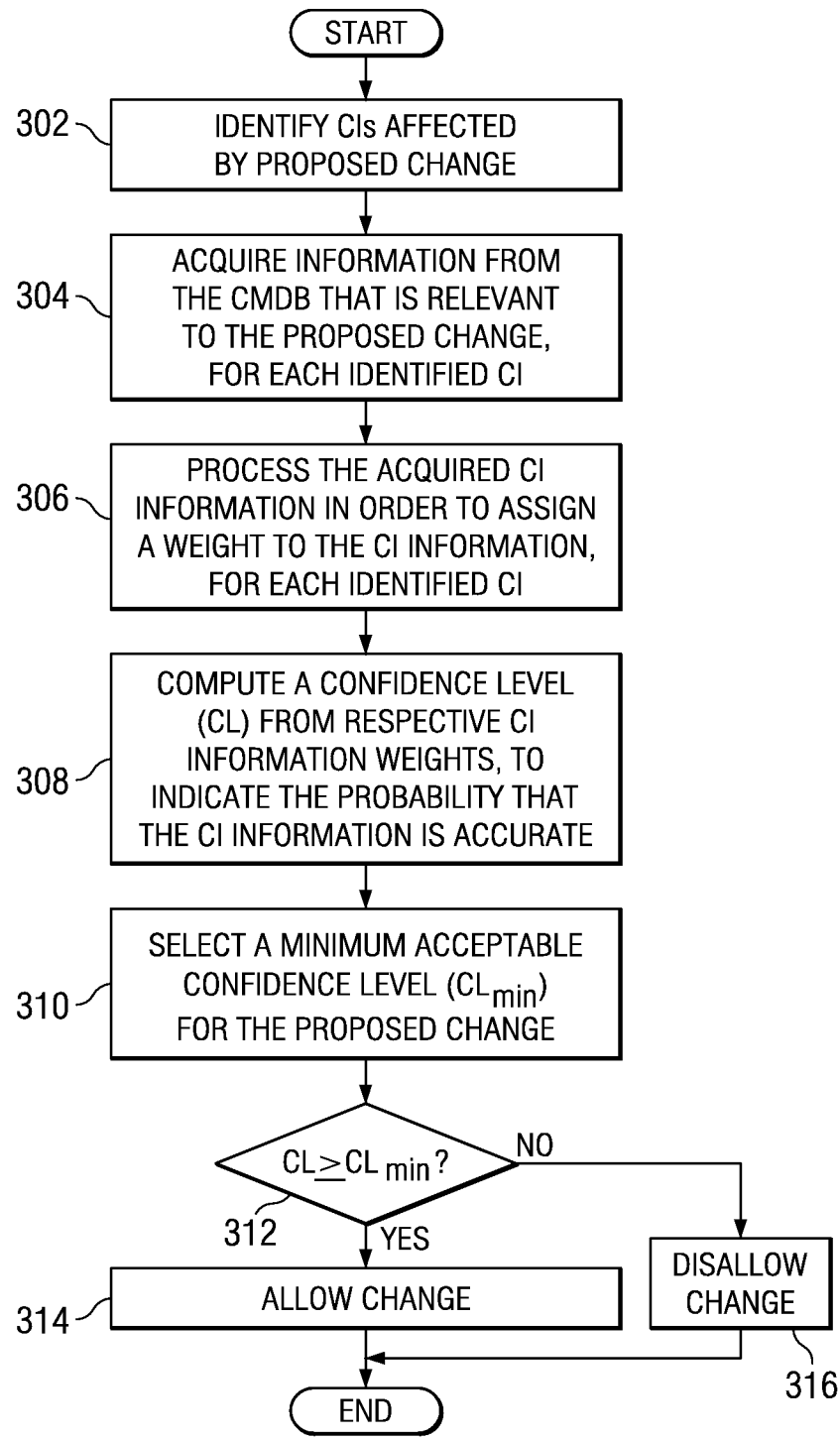

METHOD FOR PROVIDING ASSISTANCE IN MAKING CHANGE DECISIONS IN A CONFIGURABLE MANAGED ENVIRONMENT

This application is a continuation of application Ser. No. 11/627,398, filed Jan. 26, 2007, status abandoned.

BACKGROUND OF THE INVENTION

1. Field of the Invention

The invention disclosed and claimed herein generally pertains to a method for providing assistance in decision making in a configurable managed environment or system, that includes a configuration management database (CMDB) and configuration items (CI). More particularly, the invention pertains to a method of the above type for providing assistance in determining whether or not to make a change in the system that would affect one or more of the CIs. Even more particularly, the invention pertains to a method of the above type for computing a confidence level representing the probability that information provided by the CMDB is accurate. The Change Manager also gets the information on the impact of the proposed change.

2. Description of the Related Art

Configuration management is a critical process responsible for identifying, controlling and tracking all versions of hardware, software, documentation, and other inanimate components of a configurable managed environment, such as an Information Technology organization. The goal of configuration management is to ensure that only authorized components, referred to as configuration items (CIs), are used in the configurable managed environment, and that all changes to CIs are recorded and tracked throughout the life cycle of the component. The configuration management process includes performing tasks such as identifying CIs and their relationships, and adding them to the CMDB. The CMDB is a database that contains all relevant details for each CI, such as relationships between CIs, state or status, and historical information. Some examples of CIs are Computer System, Application Server etc. The data and relationships in the CMDB are used by a system manager, referred to as a Change Manager, for making changes in the configurable managed environment or system, wherein the changes generally will affect one or more of the configuration items. A definition of the Change Manager, provided by the Information Technology Infrastructure Library (ITIL), is set forth hereinafter.

The CMDB nominally contains the latest information of the above type for all CIs, such as the states and relationships thereof. Information about respective CIs is referred to herein as configuration item data (CID). In a configurable managed environment, as events occur that change the states or relationships of respective CIs, the CMDB must be synchronized accordingly. That is, the CMDB must be updated, so that the data contained therein will represent the new CID, that is, new realities of the CIs. However, in a configurable managed environment of the above type, multiple point products are commonly present that create and change relationships among the CIs. Such point products are described hereinafter in further detail, and may, for example, comprise devices such as the Tivoli Configuration Manager (TCM), a product of International Business Machines Corporation. The multiple point products are also commonly used to report changed conditions of the CIs to the CMDB.

Because the CMDB receives CI change data from different point products, it can happen that data received from the different point products, in regard to the same CIs, will be in conflict. Moreover, delays of varying lengths may occur between actual changes of CI conditions, and the reporting of such changed conditions to the CMDB. As a result, a typical CMDB that is being populated with data from multiple point product sources cannot be kept in synchronization with the actual real world condition of all CIs, since it is virtually impossible to keep CID synchronization up to date.

In a configurable managed environment or system, Change Managers make systems management decisions based on the state and relationships of the CIs, as shown by information in the CMDB. Some changes to the environment are trivial, while other changes can have serious consequences. For example, a change such as disabling a monitoring service on a hardware CI will usually be of low impact, while deleting a software component from a server for a change management operation can have serious consequences. However, as discussed above, CMDB information available to the Change Manager is likely to contain inaccuracies, even though such information is to be used as the basis for making changes. Accordingly, it would be desirable to provide the Change Manager with a tool that could serve as an aid in determining whether or not to make certain changes that affect CIs. The tool would take into account both the possibility of inaccurate CMDB information, and the comparative impact of the proposed change and provide information on the probability of a given change being successful or a failure.

SUMMARY OF THE INVENTION

In association with a CMDB containing information that relates to configuration items (CIs) in a configurable managed system, wherein a change station is provided to make respective changes, a method is provided for determining whether to allow a particular change that would affect at least one of the CIs. The method comprises the steps of acquiring information from the CMDB pertaining to CIs that would be affected by the particular change, and processing the acquired information to compute a confidence level indicating the probability that the acquired information is correct. A particular change is then allowed to be made in the configurable system only if the confidence level is no less than a pre-specified minimum value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flow chart showing respective steps for an embodiment of the invention.

DETAILED DESCRIPTION OF THE PREFERRED EMBODIMENT

Figure 1:
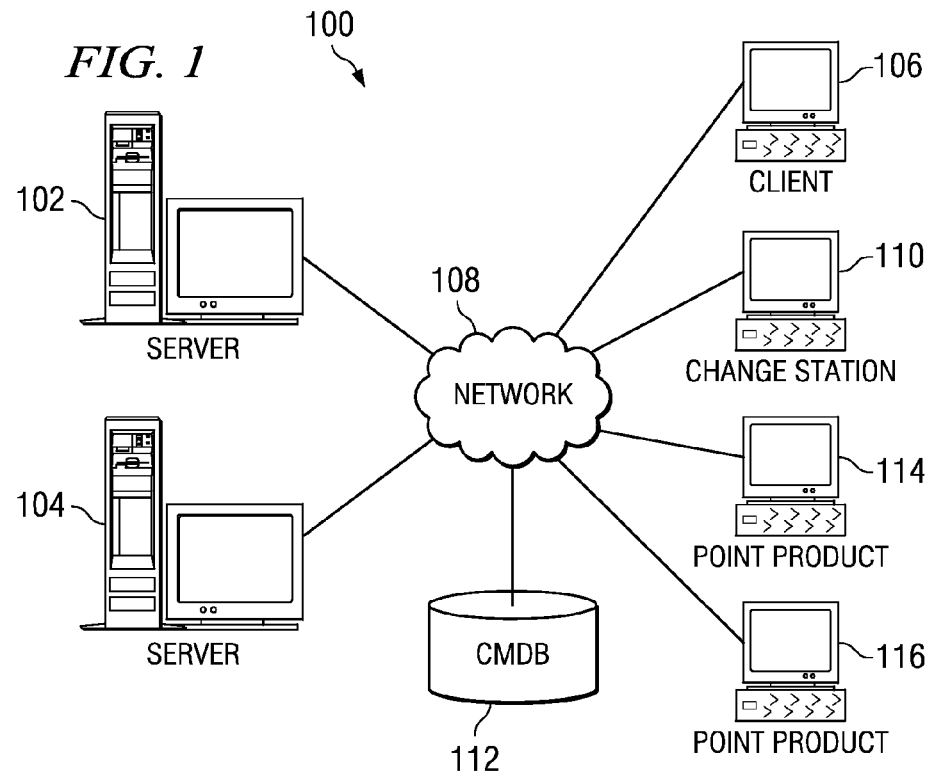
FIG. 1 is a schematic diagram showing a configurable managed system in which an embodiment of the invention may be carried out.

Referring to FIG. 1, there is shown a configurable managed system or environment 100 that includes a number of inter-related configuration items (CIs). Well known types of CIs include desktop computers, servers and computer clients, which are exemplified in FIG. 1 by servers 102 and 104, and by client 106. While not shown, the hardware CIs of system 100 may contain operating systems, application programs and other software components that are also CIs. Respective CIs of configurable system 100 can be selectively connected to one another by means of a network 108, which may, for example, comprise the Internet or a LAN.

Referring further to FIG. 1, there is shown system 100 provided with a CMDB 112 and point products 114 and 116. The point products are components that monitor or provide management services for the CIs of system 100, and furnish data concerning respective CIs to CMDB 108. Thus, CID information pertaining to CIs, wherein the CIs include hardware, software, and monitoring applications, is stored in CMDB 108 by multiple point product sources, exemplified in FIG. 1 by point products 114 and 116. The CID information includes relationships between the CIs. Each of the point products may comprise, for example, a Tivoli Configuration Manager (TCM) as described above, or a Tivoli Provisioning Manager or IBM Tivoli Monitor. These are each well known products and systems made available by the International Business Machines Corporation. Alternatively, such products could include a BMC protocol or a Microsoft SMS.

Since information is supplied to CMDB 112 from multiple product point sources, it frequently happens that two or more sources send information to the CMDB that all pertains to the same CI. Also, if the CI includes a number of different configurable elements, information sent to the CMDB for the CI may include data representing the value or state of each element. For example, if the CI comprises a computer component having a hard drive, data stored in the CMDB for the CI could include a value indicating the hard drive storage capacity.

FIG. 1 further shows a computer work station, comprising a change station 110, for use by a Change Manager, or another administrator or user associated with configurable managed system 100. In a system of this type, for example a new healthcare system, it is typically necessary to make sure that there are sufficient hardware and software resources, sufficient power and training, and sufficient other types of resources. System changes to some of the resources can impact other resources as well. Accordingly, a Change Advisory Board (CAB) may be established to oversee changes, and a Change Manager, or another administrator or user, is tasked with executing changes.

Change station 110 is operable by the Change Manager or other user to establish and change relationships between respective CIs. Accordingly, change station 110 is provided with a user interface as further indicated at FIG. 2. For example, change station 110 could be operated by the Change Manager or other user to install an application into one of the servers 102 or 104, or to disconnect a point product monitor from another CI. Change station 110 may also be operated to carry out an embodiment of the invention, as described herein.

Figure 2:
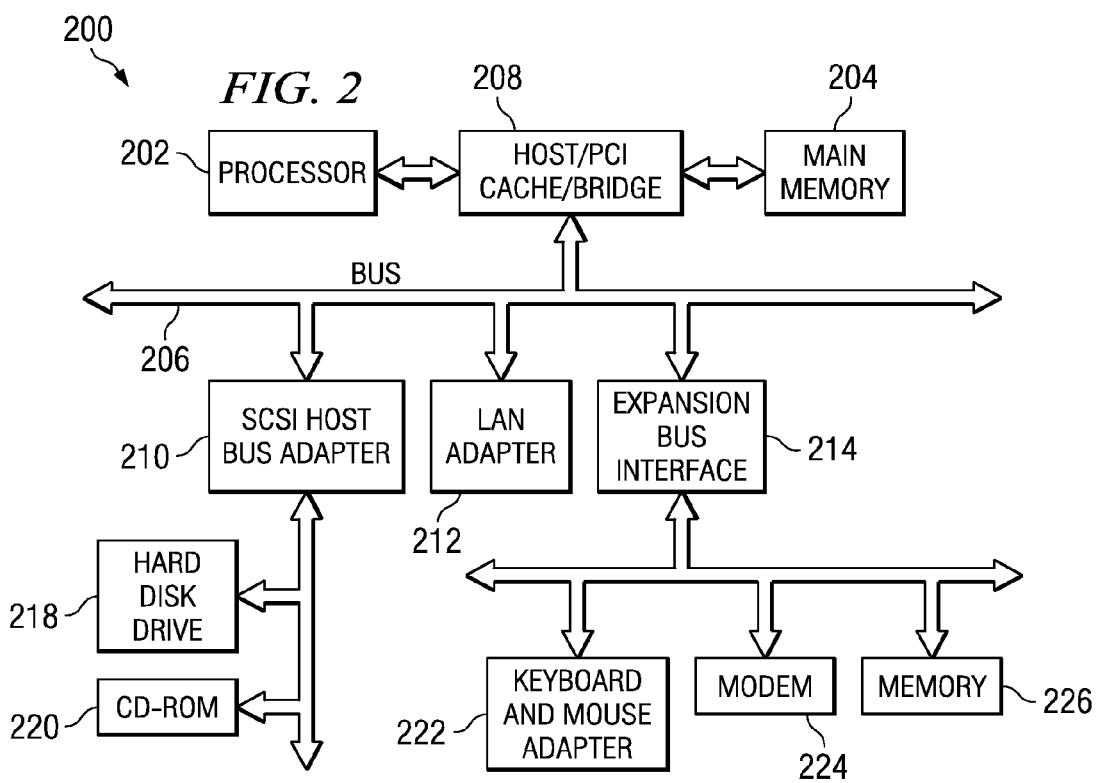
FIG. 2 is a block diagram showing a computer or data processing system for implementing a change station that may be used in the system of FIG. 1.

Referring to FIG. 2, there is shown a block diagram of a generalized data processing system 200 which may be used to implement change station 110. Data processing system 200 exemplifies a computer, in which code or instructions for implementing the processes of the present invention may be located. Data processing system 200 usefully employs a peripheral component interconnect (PCI) local bus architecture, although other bus architectures may alternatively be used. FIG. 2 shows a processor 202 and main memory 204 connected to a PCI local bus 206 through a Host/PCI bridge 208. PCI bridge 208 also may include an integrated memory controller and cache memory for processor 202.

Referring further to FIG. 2, there is shown a local area network (LAN) adapter 212, a small computer system interface (SCSI) host bus adapter 210, and an expansion bus interface 214 respectively connected to PCI local bus 206 by direct component connection. SCSI host bus adapter 210 provides a connection for hard disk drive 218, and also for CD-ROM drive 220. Expansion bus interface 214 provides a connection for user interface elements such as a keyboard and mouse adapter 222, modem 224, and additional memory 226.

An operating system runs on processor 202 and is used to coordinate and provide control of various components within data processing system 200 shown in FIG. 2. The operating system may be a commercially available operating system such as Windows XP, which is available from Microsoft Corporation. Instructions for the operating system and for applications or programs are located on storage devices, such as hard disk drive 220, and may be loaded into main memory 204 for execution by processor 202.

The CI data reported from multiple products is in a standard form, and the CI information from all the products is consolidated into a single CI data item. As discussed above, it is likely that at any given time, at least some of the data stored in the CMDB for a particular CI will not be accurate. This is due in part to delay between an actual change in the condition or state of a CI, and the reporting of the change to the CMDB. Inaccuracies can also result from conflicts in information pertaining to a CI that is reported to the CMDB by different point products. Thus, when the Change Manager is tasked with making a proposed change to the configurable managed system 100, wherein the change will affect one or more CIs, change station 110 can be used to implement a procedure in accordance with the embodiment of the invention, as illustrated by FIG. 3. This procedure will reduce the possibility of adverse consequences that are caused by making a change based on inaccurate CI information in the CMDB.

Referring to FIG. 3, there is shown an initial step 302 of identifying each of the CIs that are affected by a proposed change. Such identification is performed by the CMDB, which is a repository for information pertaining to all CIs of a system, including the states and relationships thereof. When the CMDB receives data indicating a proposed change, it will be able to determine, from the relationships existing therein, whether a particular CI will be affected by the changes. If so, the CMDB identifies the particular CI.

At step 304, information stored in the CMDB for one of the identified CIs is selected or acquired from the CMDB, wherein the acquired information is relevant to the proposed change. For example, the proposed change could require loading an application into the hard drive of a particular CI, so that it would be necessary to know the available capacity of the hard drive. While the CMDB might contain reports listing information for a number of elements of the particular CI, only the value of hard drive capacity would be pertinent to the proposed change. Step 304 would be carried out for all of the CIs identified at step 302.

It will be appreciated that in some situations a particular source of information will have such authority, relative to competing sources, that the conflicting data from the other competing sources will not be considered. For example, Service Advertising Protocol (SAP) is a service for managing server assets in a system. When a server is first brought into the system, SAP makes a record of the server model and serial number, and of the operating system placed therein. A year later, a point product conducts a scan and indicates that a different operating system is in the server. The SAP is an authoritative system, but its information can be out of date, if the operating system was changed but the SAP was not informed of the change. On the other hand, the point product can perform a scan to correctly identify the operating system, at the time such information is requested. Accordingly, the point product data will simply be accepted over the data from SAP.

As a further example for illustrating the embodiment of FIG. 3, the hard drive capacity of the particular CI is stated to be 200 GB in three reports sent to the CMDB, but is stated to be 100 GB in one other report. In view of this discrepancy, it becomes necessary to assign a confidence level, or weight, to the information pertaining to this element of the particular CI, as shown by step 306 of FIG. 3. With three reports indicating the 200 GB hard drive value against only one report for the 100 GB value, a comparatively high confidence level would be assigned to the 200 GB value. However, if all the reports indicated very different values from one another, the confidence level for this configurable element would be relatively low. CMDB reports typically are stored in a log file or in a data warehouse. Decisions about respective reports are revisited when new information becomes available.

More generally, where there are discrepancies or disagreements between multiple reports in the CMDB for a CI or CI element, weights are assigned to the CI based on one or more criteria. These criteria can include the number of times a CI has been read by other CIs, the number of times a CI has been written to or updated by other CIs, the number of relationships that a CI has with other CIs, as shown by information in the CMDB, and how recently a CI was last accessed or updated.

Moreover, if one report for a CI element is several years old and another report is very recent, the more recent report will be given significantly higher weight. Generally, a weight can be determined on the basis of a known update or synchronization by a point product source, or can be based on a reported revision level, patch level or update level, giving greater weight to the most recent of such events. A weight can also be based on the date of a report or most recent report update, or on the frequency of access to the report.

After weighting the accuracy of the information for each of the CIs, such as by using one or more of the weighting approaches described above, one of the sources may appear to be so much more reliable than all others that the data from such source will be selected as the correct data. Otherwise, it is necessary to compute an over-all confidence level, as shown by step 308 of FIG. 3. The confidence level may be determined from following the expression:

$$\text{Confidence Level} = (X^* \text{No. of writes to the } CI)/(Y^* \text{No. of } CI \text{ Relationships})$$

where X and Y are constants. Thus, confidence level is increased by increasing the number of writes to the CR, and decreased by decreasing the number of relationships.

As a further example, it is proposed that the configurable managed system 100 be changed by loading a specified software application into the hard drive of a server, wherein both the application software and the server are CIs of system 100. To perform this task, the server hard drive must have enough available capacity to accommodate the size of the application. From steps 304 and 306 discussed above, change station 110 has determined that the application requires X MB of storage, with an 80% weighting that this information is correct. Similarly, change station 110 has determined that the hard drive of the server has available storage capacity of X MB, with a 70% weighting that this information is accurate. Accordingly, change station 110 carries out step 308 of FIG. 3 by averaging the weights for the two CIs affected by the proposed task, to compute a confidence level of 75%.

At step 310, it is necessary to select the minimum acceptable value of confidence level ($CL_{min}$) for the proposed change. This value could be predetermined for a possible or prospective change to a CI, and would correspond to the comparative amount of harm that would result if the change was carried out based on information found to be incorrect. In one embodiment, a table would be preconfigured to list a number of specified changes that could be made to system 100. The table would further list the minimum confidence level values needed to allow respective listed changes to be made. The table (not shown) could reside in the CMBD, or elsewhere in system 100. The determination of confidence level would generally be based on heuristics, or knowledge based on experience. It could also be based on collected historical data, that was continually updated.

For the above example, an inability to load the software application into the server would be a comparatively adverse consequence for system 100. Accordingly, the minimum confidence level to allow this proposed task to proceed is usefully predetermined to be 70%. Such value would therefore be selected from the table by change station 110, in accordance with step 310 of FIG. 3. At step 312, the computed confidence level of 75% is compared with the 70% minimum acceptable level value. Since the computed value is greater, the change is allowed to be made, as shown by step 314. Step 316 emphasizes that changes are disallowed, whenever the computed confidence level is less than the minimum acceptable value.

The following are examples of changes that a Change Manager could execute, after finding that the confidence level was at or above the minimum acceptable value:

Install a Patch on a set of servers that hosts a business application.

Hot Swap Storage in an environment.

Upgrade a business software application to the next version/release.

Upgrade a router that is connected to several servers.

As a further feature, an embodiment of the invention can be configured to provide notice to a user, when a confidence level is found to be below the acceptable minimum. Also, a Change Manager may be authorized in certain situations to execute a change, even when the confidence level is less than the acceptable minimum value. For example, notwithstanding a low confidence level, the Change Manager may be willing to risk possible inaccuracies, where action is necessary to avoid hacking or the loss of important data.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a configuration management database (CMDB) containing information that relates to configuration items (CIs) in a configurable managed system, wherein a change station is provided to make respective changes, a method for determining whether to allow a particular change that would affect at least a given one of the CIs, said method comprising the steps of:
    acquiring information from said CMDB pertaining to the given CI that would be affected by said particular change, wherein said acquiring step includes identifying CIs that would be affected by said particular change;
    selectively processing said acquired information to compute a confidence level indicating the probability that said acquired information is correct based on a time of most recent synchronization of the given CI and a number of reads and writes of the given CI in the CMDB;
    assigning weights to respective identified CIs, wherein the weight assigned to a given CI represents the probable accuracy of information acquired from said CMDB that pertains to said given CI, wherein said assigned CI weights are respectively processed to compute said confidence level; and
    allowing said particular change to be made in said configurable system only if said confidence level is no less than a pre-specified minimum value.

2. The method of claim 1, wherein the change station is a plurality of change stations that are each configured to monitor and provide management services for the CIs and furnish data concerning respective ones of the CIs to the CMDB.

3. The method of claim 1, wherein the acquired information includes at least one discrepancy pertaining to a given CI of the CIs.

4. The method of claim 1, wherein the acquiring step is performed by the CMDB.

5. In association with a configuration management database (CMDB) containing information that relates to configuration items (Cis) in a configurable managed system, wherein a change station is provided to make respective changes, a method for determining whether to allow a particular change that would affect at least a given one of the CIs, said method comprising the steps of:
    acquiring information from said CMDB pertaining to the given CI that would be affected by said particular change;
    determining a first value that represents the time of the most recent synchronization of said given CI with said CMDB;
    determining a second value, wherein the second value is determined from one or both of the number of reads made from said given CI by other CIs, and the number of writes made to said given CI from other CIs, selectively;
    using said first value and said second value, collectively, to derive a weight that is assigned to said given CI, wherein said derived weight is related to the probable accuracy of said information acquired from said CMDB;
    selectively processing said derived weight to compute a confidence level indicating the probability that said acquired information is correct; and
    allowing said particular change to be made in said configurable system only if said confidence level is no less than a pre-specified minimum value.

6. The method of claim 5, wherein:
said acquiring step includes identifying a plurality of CIs that each would be affected by said particular change.

7. The method of claim 6, wherein:
said method includes assigning a weight to each CI of said plurality, wherein the weight assigned to a particular CI of said plurality represents the probable accuracy of information acquired from said configuration management database that pertains to said particular CI.

8. The method of claim 7, wherein:
the assigned CI weights of said plurality of CIs are collectively processed to compute said confidence level.

9. The method of claim 7, wherein:
said confidence level is determined by averaging said weights.

10. The method of claim 7, wherein:
said confidence level is determined by selecting data associated with the CI having the highest assigned weight.

11. The method of claim 5, wherein:
the weight of said given CI is further derived using a third value, that represents the number of relationships said given CI has with other CIs in said system.

12. The method of claim 5, wherein:
said method includes generating a table that lists a number of specified changes that could be made to said system, and that further lists the minimum confidence level values that are needed to allow respective specified changes to be made.

13. In association with a configuration management database (CMDB) containing information that relates to configuration items (CIs) in a configurable managed system, wherein a change station is provided to make respective changes, a computer program product in a computer readable storage memory for determining whether to allow a particular change that would affect at least a given one of the CIs, said computer program product comprising:

instructions for acquiring information from said CMDB pertaining to the given CI that would be affected by said particular change;

instructions for determining a first value that represents the time of the most recent synchronization of said given CI with said CMDB;

instructions for determining a second value, wherein the second value is determined from one or both of the number of reads made from said given CI by other CIs, and the number of writes made to said given CI from other CIs, selectively;

instructions for using said first value and said second value, collectively, to derive a weight that is assigned to said given CI, wherein said derived weight is related to the probable accuracy of said information acquired from said CMDB;

instructions for selectively processing said derived weight to compute a confidence level indicating the probability that said acquired information is correct; and instructions for allowing said particular change to be made in said configurable system only if said confidence level is no less than a pre-specified minimum value.

14. The computer program product of claim 13, wherein:
instructions are provided for identifying a plurality of CIs that each would be affected by said particular change.

15. The computer program product of claim 14, wherein:
instructions are provided for assigning a weight to each CI of said plurality, wherein the weight assigned to a particular CI of said plurality represents the probable accuracy of information acquired from said configuration management database that pertains to said particular CI.

16. In a configurable managed system, provided with configuration items (CI) and with a change station adapted to make respective changes, apparatus for determining whether to allow a particular change that would affect at least a given one of the CIs, said apparatus having a processor and further comprising:

a configuration management database (CMDB) containing information that relates to configuration items (CIs);

a device for acquiring information from said CMDB pertaining to the given CI that would be affected by said particular change;

a device for determining a first value that represents the time of the most recent synchronization of said given CI with said CMDB;

a device for determining a second value, wherein the second value is determined from one or both of the number of reads made from said given CI by other CIs, and the number of writes made to said given CI from other CIs, selectively;

a device for using said first value and said second value, collectively, to derive a weight that is assigned to said given CI, wherein said derived weight is related to the probable accuracy of said information acquired from said CMDB;

a device for selectively processing said derived weight to compute a confidence level indicating the probability that said acquired information is correct; and a comparator device for allowing said particular change to be made in said configurable system only if said confidence level is no less than a pre-specified minimum value.

17. The apparatus of claim 16, wherein:
said acquiring device is adapted to identify a plurality of CIs that each would be affected by said particular change.

18. The apparatus of claim 17, wherein:
said processing device assigns a weight to each CI of said plurality, wherein the weight assigned to a particular CI of said plurality represents the probable accuracy of information acquired from said configuration management database that pertains to said particular CI.

19. The apparatus of claim 18, wherein:
said processing device processes respective assigned weights of said plurality of CIs collectively, to compute said confidence level.

20. The apparatus of claim 16, wherein:
said apparatus includes means for generating a table that lists a number of specified changes that could be made to said system, and that further lists the minimum confidence level values that are needed to allow respective specified changes to be made.

* * * * *